July 30, 1935. O. M. URBAIN 2,009,753
PROCESS FOR PRODUCING LACTIC ACID
Filed March 22, 1933
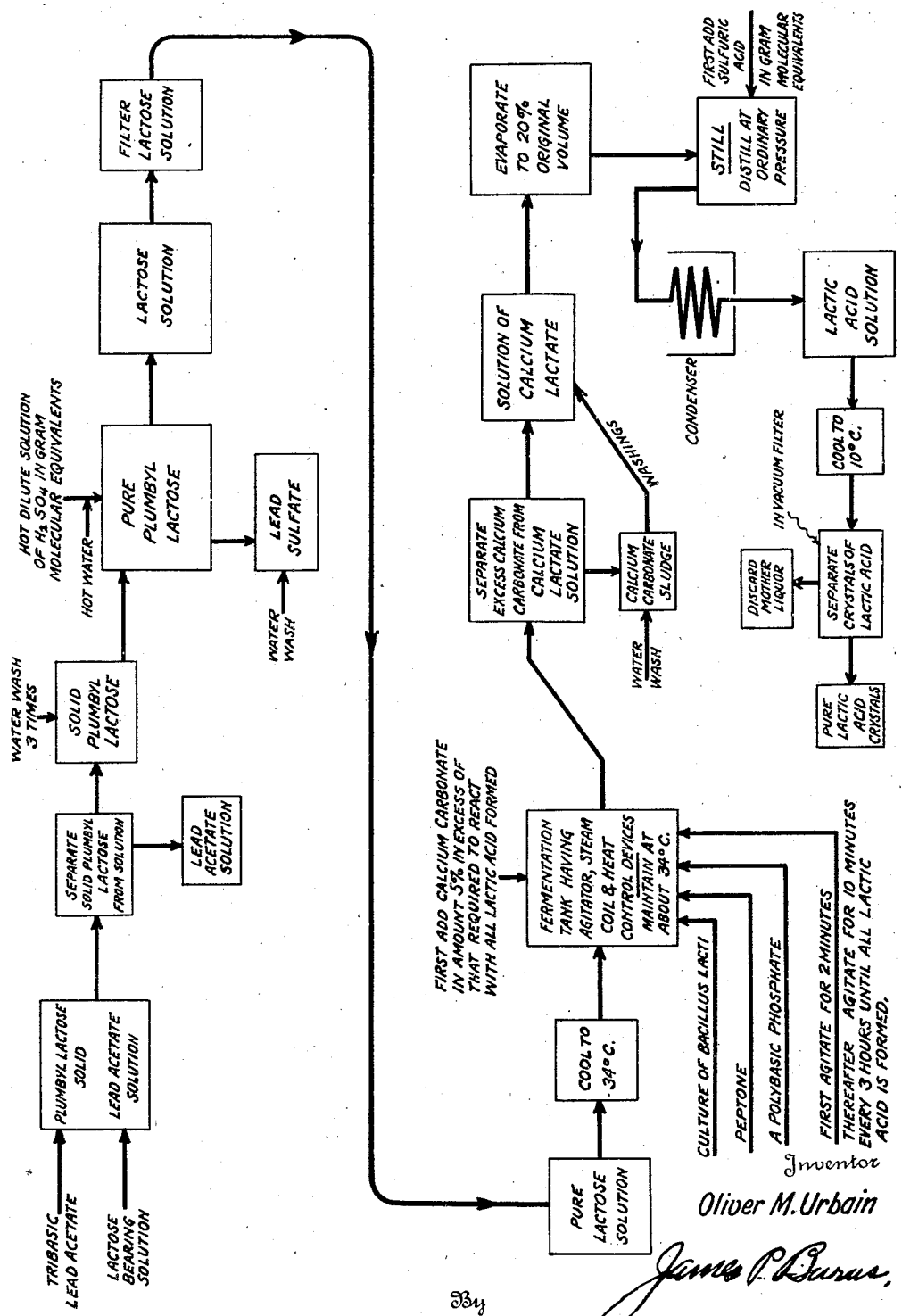
Inventor
Oliver M. Urbain
By James P. Burns,
Attorney Patented July 30, 1935

2,009,753

UNITED STATES PATENT OFFICE 2,009,753

PROCESS FOR PRODUCING LACTIC ACID

Oliver M. Urbain, Columbus, Ohio, assignor to Charles H. Lewis, Harpster, Ohio

Application March 22, 1933, Serial No. 662,162

1 Claim. (Cl. 260—120)

This invention relates to a process for producing lactic acid.

The invention contemplates an improved process for preparing lactic acid from a pure solution of lactose.

More specifically the process of the invention is one for preparing lactic acid from a pure solution of lactose derived by treating a lactose-bearing solution such as whey with tribasic lead acetate to form plumbyl lactose from which the pure lactose-bearing solution is obtained.

The pure lactose solution from which lactic acid is to be prepared can be obtained from a lactose-bearing solution such as whey by the following procedure which is diagrammatically illustrated in the accompanying flow sheet.

Referring to the left of the flow sheet, the lactose-bearing solution is first treated with tribasic lead acetate $Pb(C_2H_3O_2)_2-2PbO.H_2O$. This yields a solid plumbyl lactose and a solution of lead acetate. The reaction of the tribasic lead acetate with the lactose is as follows:—

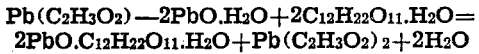

The solid plumbyl lactose and the lead acetate solution are next separated and the plumbyl lactose is water washed by decantation with a volume of water about equal to the volume of wet sludge. The first washings may advantageously be added to the lead acetate solution and the subsequent washings discarded. Usually three washings will be adequate to leave a very pure plumbyl lactose.

Disregarding the lead acetate solution, the next step embraces the treating of the pure solid plumbyl lactose with a relatively hot dilute solution of sulphuric acid ($H_2SO_4$) in gram molecular equivalents to the plumbyl lactose. Pure lactose in solution and lead sulfate are the products of this reaction. Dilute $H_2SO_4$ is employed as concentrated acid would cause decomposition of the lactose. The reaction is as follows:—

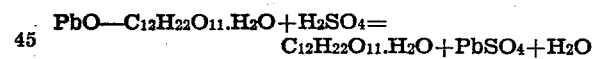

The lactose solution is now separated from the solid lead sulfate and the latter water washed. The washings may be added to the lactose solution if desired.

The lactose dissolved in the hot water is practically free of all impurities.

Lactic acid is volatile in steam at temperatures below its boiling point and, being volatile in steam, it is not possible to concentrate a solution of lactic acid by simple distillation or evaporation. I can, however, concentrate a bound lactic acid solution by either method. I, therefore, proceed as follows: I first cool the hot lactose solution to about 34° C., and transfer the solution to a suitable tank equipped with an agitator, steam coil, and heat control devices. Next, add calcium carbonate in an amount 5% in excess of that computed necessary to react with all the lactic acid which will be formed upon the fermentation of the lactose; also add culture of a lactic acid producing bacilli, peptone and a polybasic phosphate. I then agitate for approximately two minutes, and thereafter agitate every three hours for a period of about ten minutes until all lactose has been converted to lactic acid which, in turn, reacts with the calcium carbonate to form calcium lactate. The excess calcium carbonate is permitted to settle out and the solution of calcium lactate drawn off. I may wash the sludge once and add washings to the calcium lactate solution. The calcium lactate solution is now transferred to evaporators and evaporated to approximately 20% of the original volume, and treated with $H_2SO_4$ to release lactic acid.

Lactic acid is a solid at about 18° C. and by cooling the solution of lactic acid to around 10° C. crystals of the acid readily separate from the mother liquor, leaving the impurities and water behind. I, therefore, cool the lactic acid solution recovered by the distillation step to a temperature of around 10° C. The crystals are small, forming a sort of mush which can be readily removed from the mother liquor, for example, by means of a small vacuum filter also operated at a temperature of around 10° C. The cooling of the solution may be effected by ordinary refrigerating means though I prefer to use "dry ice", that is, frozen liquid carbon dioxide gas. After removal of the mother liquid, the lactic acid crystals are recovered. They may be recovered in suitable containers to be thereafter melted to give lactic acid of a very high concentration and purity.

In order to demonstrate the actual working of the process, the following example is given: Assume that one wishes to produce and recover the lactic acid as a result of the fermentation of the lactose from 2000 gallons of sweet whey containing 5% lactose and that the whey will weigh 10 pounds to the gallon. The whey will contain 1000 pounds of lactose. Since 808 units of tribasic lead acetate reacts quantatively with 720 units of lactose to form 1166 units of plumbyl lactose and 325 units of lead acetate, I therefore add 1122 pounds of tribasic lead acetate. I have precipitated 1619 pounds of plumbyl lactose. Lead acetate amounting to 451 pounds is formed in the reaction. I may recover the lead in the lead acetate. To do this I employ sodium sulfate. Since 142 units of sodium sulfate reacts with 325 units of lead acetate to form 303 units of lead sulfate, I add to the effluent and washings from the first step in the process 197 pounds of sodium sulfate and have precipitated 420 pounds of pure lead sulfate. Up to this point, which includes the first phase of the process, I have used 1122 pounds of tribasic lead acetate and 197 pounds of sodium sulfate and recovered, as valuable products, 1619 pounds of plumbyl lactose and 420 pounds of lead sulfate. The mode of procedure to this point is as follows: Transfer the clarified whey to suitable tank equipped with agitator and proper drains for the removal of sludge and the withdrawal of the effluent. Add tribasic lead acetate and agitate 5 minutes, let settle, draw off effluent into another tank similar to the first tank, add sodium sulfate, agitate 5 minutes and let settle. To the plumbyl lactose sludge in the first tank add water in an amount equal to the sludge and wash adding the first washing to the effluent in the second tank. Repeat the washing twice more and discard the last two washings. This yields 1619 pounds of very pure plumbyl lactose. After the settling of the effluent is completed the supernatant liquid is drawn off, leaving the lead sulfate as sludge.

The second phase of the process is concerned with the recovery of the lactose bound up in the plumbyl lactose. As 1619 pounds of plumbyl lactose contains 1000 pounds of lactose, and as lactose is soluble 40 parts in 100 parts of hot water, I add hot dilute sulfuric acid in an amount sufficient to react with all of the plumbyl lactose and hot water in an amount sufficient to dissolve all the released lactose. About 2500 pounds of hot water or 315 gallons is required, exclusive of the volume of sulphuric acid employed. The proper way to proceed is to mix the concentrated sulfuric acid with about 325 gallons of cold water and heat to boiling. Since 98 units of sulfuric acid reacts with 583 units of plumbyl lactose to release 360 units of lactose and form 303 units of lead sulfate, it will require for a complete reaction 272 pounds of sulfuric acid.

There is released 1000 pounds of lactose which is in solution in the hot water which carried the sulfuric acid. The lactose solution is drawn off and the sludge is washed with water, the first washings being added to the lactose solution. I now have approximately 1000 pounds of pure lactose in solution.

The procedure for this second phase of the process is as follows: To the plumbyl lactose formed in the first phase, I add 325 gallons of hot dilute sulfuric acid containing 272 pounds of sulfuric acid, agitate 10 minutes, let settle, draw off lactose solution, wash lead sulfate sludge once with hot water and add washings to lactose solution and filter lactose solution through a small vacuum filter.

The third phase of the process is concerned with the conversion of the lactose recovered in the second step to lactic acid and the subsequent recovery of the lactic acid. Lactose ferments in the presence of bacillus lacti to lactic acid according to the following reaction:

$$C_{12}H_{22}O_{11}.H_2O = 4CH_3-CHOH-COOH$$

As shown by the reaction, 360 units of lactose produces upon fermentation 360 units of lactic acid. Since I have in solution 1000 pounds of lactose, I would, if the fermentation were 100% complete to lactic acid, have 1000 pounds of lactic acid. In practice the reaction will seldom be over 95% complete to lactic acid. Therefore, I will have as an end product about 950 pounds of lactic acid.

According to the present invention, I cool the hot lactose solution to 34° C. with cold water and transfer the cooled lactose solution to a fermentation tank. The tank should be equipped with agitators, steam coils for heating and heat regulating devices to maintain an average temperature of 34° C. Calcium carbonate is added in an amount sufficient to neutralize all the lactic acid which will be formed as a result of the fermentation of the lactose plus 5% in excess. The reaction between lactic acid and calcium carbonate is as follows:

$$2HC_3H_5O_3 + CaCO = Ca(C_3H_5O_3)_2 + H_2CO_3$$

It is seen from the reaction above that 100 units of calcium carbonate will neutralize 180 units of lactic acid. To neutralize 1000 pounds of lactic acid there is required 555.5 pounds of calcium carbonate, and as 5% in excess is used, I employ 583 pounds of calcium carbonate. The calcium carbonate used should be the technical grade to guard against the introduction of impurities. I now add a culture of a lactric acid producing bacilli, 5 pounds of peptone and 5 pounds of trisodium phosphate, and agitate a few minutes. The temperature is maintained at, or near, 34° C. and the solution agitated for ten minutes every three hours to neutralize the lactic acid as formed. It will require, under these conditions, and with the use of virulent culture of a lactic acid producing bacilli, about 72 hours to complete the fermentation of the lactose to lactic acid. The solution is treated with $H_2SO_4$ to release lactic acid bound up in calcium lactate.

After the evaporation as previously described, the solution is distilled by simple distillation, the distillate then cooled to around 10° C. and maintained at this temperature for approximately three hours. The crystal-containing mush is then transferred to a vacuum filter and the filtering effected while the material is maintained at a temperature of about 10° C., effecting a separation of the lactic acid crystals from the mother liquor. The mother liquor is discarded and the lactic acid recovered as the product.

Having thus described my invention, what I claim is:—

A process for the production of lactic acid from fermentation liquors derived by the fermentation of a solution of lactose, comprising concentrating the calcium lactate solution formed by said fermentation to approximately 20% of its original volume, adding dilute sulfuric acid, and distilling the concentrated solution at substantially atmospheric pressure, cooling the distillate recovered to a temperature of approximately 10° C., filtering the same while at such temperature to separate the lactic acid crystals from the mother liquor, discarding the mother liquor and recovering the lactic acid crystals as the product of the process.

OLIVER M. URBAIN.